Figure 4:
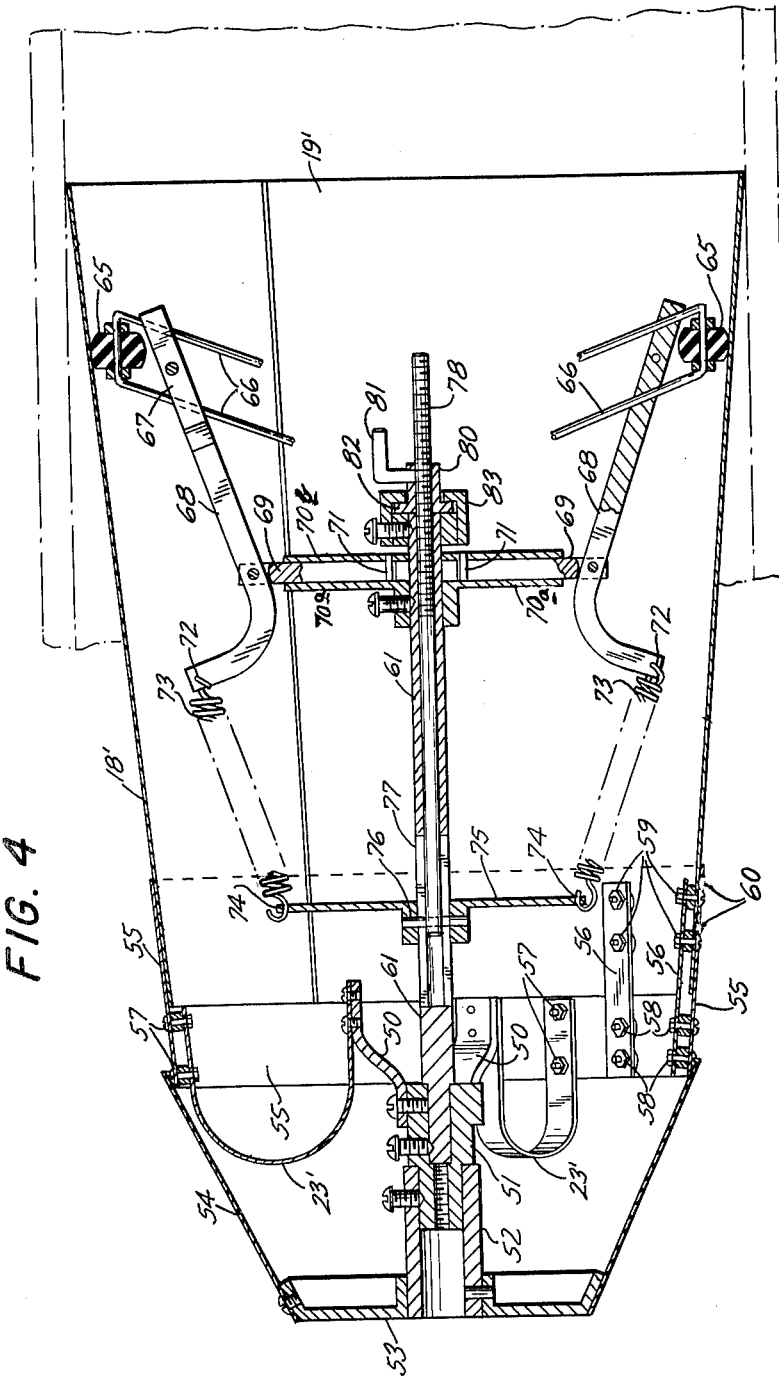

June 28, 1966  F. E. RUEGSEGGER  3,257,698
APPARATUS FOR TROWELING PLASTIC LININGS IN CONDUITS AND THE LIKE
Filed April 24, 1964  2 Sheets-Sheet 1
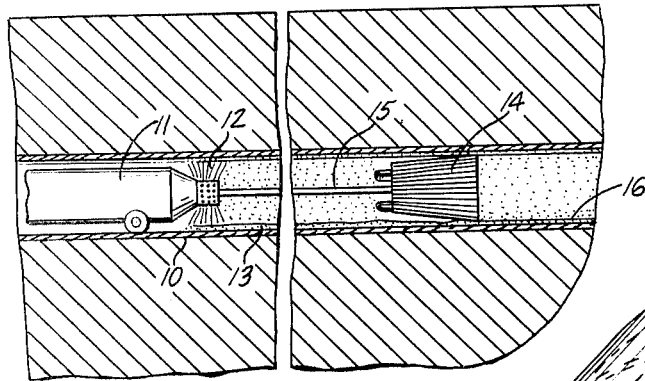
FIG. 1
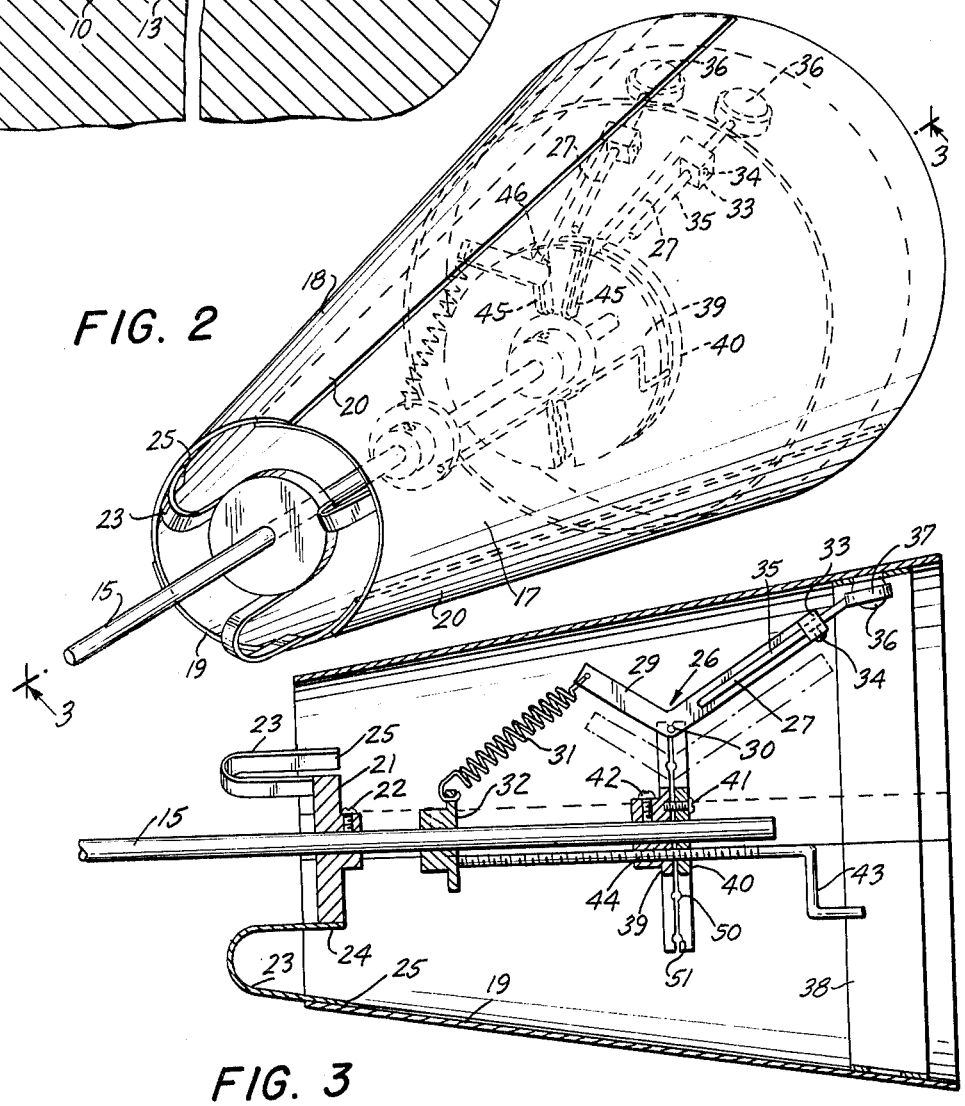
FIG. 2
FIG. 3

June 28, 1966 F. E. RUEGSEGGER 3,257,698
APPARATUS FOR TROWELING PLASTIC LININGS IN CONDUITS AND THE LIKE
Filed April 24, 1964 2 Sheets-Sheet 2

United States Patent Office 3,257,698
Patented June 28, 1966

3,257,698
APPARATUS FOR TROWELING PLASTIC LININGS IN CONDUITS AND THE LIKE
Frank E. Ruegsegger, Pompton Lakes, N.J., assignor to Raymond International Inc., New York, N.Y., a corporation of New Jersey
Filed Apr. 24, 1964, Ser. No. 362,361
11 Claims. (Cl. 25—38)

This invention relates to apparatus for troweling plastic linings in conduits and the like, and more particularly the invention, among other possible uses, is adapted for smoothing linings such as of Portland cement, concrete or other material while still in plastic condition as applied to the interior walls of underground pipes and conduits.

Alternative embodiments involving features similar to certain of those of the present application, are disclosed and claimed in applicant's co-pending application Serial No. 446,060, filed April 6, 1965, which is a continuation-in-part of applicant's application Serial No. 367,021, filed May 13, 1964.

Various forms of apparatus have long been well known for applying such linings to the interior walls of underground conduits to provide protective coatings thereon. Usually such apparatus acts to throw the lining material against the walls of the pipe in such manner that the resulting plastic-lined surface will be somewhat rough or irregular unless troweling means are provided therefor in a form to be effective for rendering the lining smooth while same is still in plastic condition. When the pipe or conduit is so relatively small that the interior is not easily accessible to a workman or the dimensions of the pipe are such that known forms for example of rotary troweling mechanisms cannot be used, then it is desirable to provide troweling means for the purpose which may be pulled or dragged along through the pipe at a location shortly subsequent to the machine which applies the lining material. However, entirely satisfactory means for this purpose which will operate efficiently with satisfactory speeds has heretofore been difficult to construct, particularly in view of the fact that the troweling means must be such that it will smooth the lining in cases of areas where the pipe may be of irregular shape or size, or may have obstructions protruding more or less inwardly of the pipe. The present invention provides a novel form of drag trowel which has proven highly successful in meeting such conditions.

More specifically, in accordance with the invention, a drag trowel is provided in a form having a plurality of overlapping segments of a conical surface which together form a truncated cone (hereinafter referred to as a "cone") and the segments each being of flexible material, so mounted and controlled that the base or larger portions of the conical surface which same provide, are readily capable of expansion or contraction so that same will apply a relatively uniform pressure in the process of smoothing the pipe lining, notwithstanding irregularities which may be encountered. The means provided in accordance with the invention for so controlling the pressure of the conical surfaces against the plastic lining, may be similar in a general sense to that of the supporting frame structure within ordinary collapsible umbrellas. The particular embodiments thereof presently preferred, however, comprise numerous mechanisms (hereinafter referred to as "bell crank mechanisms") arranged at angularly spaced positions about the axis of the assembly, and within the cone of flexible material, these mechanisms being individually urged to active positions by springs, the tension of which is preferably adjustable for varying the pressure applied to the interior of the conical surfaces.

Further aspects of the invention involve improved means for mounting the forward end portions of the conical segments and for housing same in such manner as reliably to support the forward ends of the segments in condition so that the segments will be appropriately yieldable for their respective positions.

Various further and more specific objects, features and advantages of the invention will appear from the description given below, taken in connection with the accompanying drawings, illustrating by way of example preferred forms of the invention.

In the drawings:
FIG. 1 is a sectional view showing a portion of an underground pipe or conduit being lined and the lining being trowelled by the apparatus of the invention;
FIG. 2 is a perspective view partly broken away showing the structural features of a preferred embodiment of the troweling means;
FIG. 3 is a vertical sectional view further illustrating portions of the troweling means; and
FIG. 4 is a sectional view similar to FIG. 3 but showing an alternative embodiment of the invention.

Referring now to the drawings in further detail, in FIG. 1 there is shown a portion of an underground pipe as at 10, through which a pipe lining apparatus, as at 11, of any of the various well known types, is being advanced in the direction of the arrow shown, for distributing from a distributor head 12 a coating of plastic lining material 13 around upon the interior wall surfaces of the pipe. The troweling means with which the present invention is more particularly concerned is indicated generally at 14 as being dragged by a pull rod 15 at a location following the lining apparatus 11 and so as to smooth the lining to the condition indicated at 16.

Referring now to FIG. 2, the troweling assembly as here shown may be comprised preferably of a plurality of segments of a cone, for example three segments as indicated at 17, 18 and 19, so arranged with their longitudinal edges 20 overlapping, so that these three leaves or segments together form the truncated cone. These segments may be formed of relatively thin and easily flexible sheet metal such as steel or laminated thermoplastic material. The larger or trailing end of the conical assembly should be of a diameter such that its terminal edges will press firmly against the lining of the plastic material which is to be made smooth. The segments are generally sufficiently yieldable so that, for example, when used for lining a pipe having an internal diameter of eight inches, the segments will act efficiently even though such diameter may vary from place to place by as much as a considerable fraction of an inch, for example three-quarters of an inch. In case substantially larger or smaller pipes are to be lined, then with the construction as hereinafter described, these segments may be replaced by others which are correspondingly larger or smaller without necessarily replacing the mechanism contained therein, which controls the positioning and the degree of pressure applied by the segments.

At the forward end of the troweling means, same may be attached to the pull rod 15 as by the use of a circular disk 21 fixed in adjustable position along the rod 15 as by setscrew means 22. At or adjacent the periphery of this disk, yieldable U-shaped strips as at 23 are provided, each having one branch 24 of the U-formation secured as by welding to the disk 21 and with the other branch, as at 25, secured as by welding to its corresponding conical segment. This arrangement for connecting the forward end of the assembly to the pull rod is such that each of the conical segments, despite the arcuate cross-section thereof, will be free to allow the trailing end portions thereof to move inwardly and outwardly with respect to the axis to accommodate variations in the size or shape of the lined interior of the pipe.

In order to control the outward pressure which the trailing end portions of the conical segments will apply to the plastic lining, in the preferred example here shown, a plurality of spring-retained bell crank mechanisms, as indicated generally at 26, may be provided, located at various angular positions about the pull rod 15. One of these mechanisms and its supporting means is best indicated in FIG. 3, whereas two of same are shown as at 27, 28, side by side in FIG. 2, and it will be understood that like mechanisms, for example in typical cases as many as twenty or twenty-four thereof, are positioned at successive angles about the pull rod.

Each of the mechanisms 26 may comprise, as shown in FIG. 3 for example, a bell crank member 29, pivotally mounted as at 30 by means hereinafter described, and having one arm connected by a spring 31 to a collar 32, which is slidably mounted on pull rod 15. The other arm of the bell crank may be provided with a lug 33 carrying a setscrew 34 and with a rod as at 35 slidably positioned in the lug so that the rod may be more or less adjustably extended and then fixed in a desired position of adjustment by setscrew 34. The outer end of the rod 35 may carry suitable anti-friction means for engaging the interior of the conical troweling means. Such anti-friction means may, for example, in each case comprise a plastic ball 36 rotatably carried in a suitable ball cage means 37 mounted on the end of rod 27. The interior surface of each of the conical segments may have secured thereon as by welding, for reinforcing purposes, bands of metal as at 38 against which the rotatable balls 36 engage.

The pivotal mountings at 30 for the bell cranks of these numerous mechanisms may be carried on a pair of adjacent disks as at 39 and 40, suitably secured together as by screws as at 41 and carried by a hub portion which is adjustable along the rod 15 and then locked in position by setscrew 42. A manually-operable crank means 43 has threaded engagement as at 44 with the hub, and the inner end of crank means 43 bears against collar 32. Thus by turning the crank 43 in one direction, the collar 32 may be forced toward the left in FIG. 3, thereby increasing the tension of the springs 31 and increasing the pressure which the anti-friction means at 36 exerts against the interior of the conical assembly. On the other hand, by turning the crank 43 in the other direction, the springs 31 will then be able to pull the collar 32 toward the right, thereby allowing decrease of the tension in the springs and decreasing the effective outward pressure of the anti-friction means.

As best shown in FIG. 2, the disks 39, 40 are formed with a plurality of radial slots as at 45, in each of which one of the bell cranks respectively is mounted as by the use of pin means such as indicated at 46, or by a wire extending annularly around within the space between the disks 39, 40. As shown in FIG. 3, two or more annular channels as at 50, 51 may be provided between the disks 39, 40 to afford space for such wire or pivoting means and so that the bell cranks may be mounted with their pivoting points at either of two or more radial distances from the axis of the apparatus, as may be desired to accommodate conical segments of different sizes for different pipe linings.

In operation, the numerous assemblies of bell crank mechanisms as at 26 will normally be positioned so that by reason of the springs 31, the balls 36 will exert pressure on the conical segments holding same with their trailing edges expanded to a diameter sufficient so as to apply the necessary pressure to the plastic lining to smooth same, yet due to the resilient mounting mechanisms for the balls 36 or other anti-friction devices, the trailing edges of the cone will be free to move radially inwardly of the axis of the apparatus in order to follow the inside periphery of the lining which in practice may present various deviations as to diameter and cross-sectional shape.

It will be apparent that the arrangement has a high degree of flexibility as to the possibilities of adjusting same to meet varying conditions, such as varying sizes of pipes or for use for plastic coatings having various different degrees of plasticity, which may require adjustments of the applied troweling pressure. For example, the bell crank mechanisms may be readily adjusted axially of the assembly and secured by setscrew 42. The adjustment of the balls with respect to the pivot points of the bell cranks may be adjusted by adjustably positioning the supporting rods 35. Also the tension of the springs 31 may be adjusted by axially adjusting the collar 32, by means of crank 43, and in cases where the assembly has to be adjusted to accommodate considerably larger or smaller pipes, then the conical segments alone need be removed and replaced by larger or smaller segments without the necessity of replacing the bell crank mechanisms.

The embodiment of the invention shown in FIG. 4 comprises a conical structure formed of segments 17', 18' and 19' like those shown at 17, 18 and 19 in FIGS. 2 and 3. In the embodiment of FIG. 4, however, an improved mounting means is shown for the forward end portions of the segments and such mounting means may, if desired, also be used for the embodiment of FIGS. 2 and 3. Here, the U-shaped spring elements 23' are supported on their inner ends as by being affixed by screws to brackets as indicated at 50, these brackets being attached to a hub portion 51, the forward end of which may carry a thimble as at 52 to which is attached a rigid forward end plate or disk 53 closing off the forward end of the apparatus against admission of loose cement or other material, this partition being supplemented by a conical sheet metal housing as at 54, the forward edges of which may be secured as by screws to the disk 53 and the rearward or flared portions extending back to overlap the forward end portions of the troweling structure.

Within the forward end of the conical troweling assembly a more or less rigid annular band of metal as at 55 may be mounted and attached as by the use of several metal strips 56 to the forward portions of each of the conical segments. This band 55 affords relatively firm and rigid means to which the outer ends of the U-shaped spring elements 23' may be attached as by spaced-apart screws 57. The segments may be constructed of lightweight flexible material, while the band 55 will still afford sufficient rigidity to the forward portions of the structure without interferring with the flexing movements of the segments. It will be noted that the attaching strips 56 may be secured as by screws 58 to the band 55 and at their other ends the strips 56 may be attached as by screws 59 to the respective conical segments. The band 55 is formed with openings 60 at the locations of the screws 59 so that the band will not interfere with the flexing movements of the conical segments.

A rod 61 may have its forward end secured as by screws within hub portion or bushing 51, this rod extending back to provide supporting means for the mechanisms which bear against the conical segments within same. With this embodiment of the invention, anti-friction rollers as at 65, formed for example of strong tough plastic material or ceramic material, may be mounted to bear against the inside surfaces of the trailing end portions of the conical segments. Although only two of these rollers are shown in FIG. 4, it will be understood that a considerable number may be placed at angularly spaced positions within the conical structures. Each of these rollers may, for example, be mounted on generally U-shaped supporting members as at 66 adjustably retained by suitable clamping means 67 on one arm of a bell crank member, such as at 68. The pivoting points of these bell crank members may be pivotally mounted on small yoke pieces 69, each of which has a supporting shank contained within a radially directed socket formed between a pair of disks 70a and 70b, suitably secured together, the inner ends of the shanks being secured as by pins 71 engageable in holes formed in disk 70b at desired radial distances from the axis of the trowel. The disk 70a may be affixed as by screw means as shown to the rod 61 and the disk may be adjustably positioned on such rod upon loosening such screw means. The other arms of the bell cranks 68 are secured as at 72, each to one end of a spring as at 73, the other end of which spring is secured as at 74 to a disk 75. The hub of this disk may carry a pin 76 which is slidably adjustable within a slot 77 formed in the rod 61. The rod 61 is hollow and contains a screw rod 78 affixed to the pin 76. The screw rod 78, when adjusted longitudinally, thus will serve to move the disk 75 accordingly, thereby either increasing or decreasing the tension of the springs 73 and consequently thereby adjusting the pressure which the rollers 65 apply to the internal surfaces of the conical segments. The screw rod 78 may carry an internally threaded bushing 80 which is rotatable by suitable handle means 81 to thereby adjust the longitudinal position of the threaded shaft 78. The bushing 80 may be flanged as shown at 82 and embraced and held against axial movement by thimble like means 83 affixed as by screw means to the rod 61. Thus, by manipulating the handle 81, the longitudinal position of the rod 78 may be adjusted with respect to the position of the disk 70 to thereby adjust the position of disk 75 and the tension of the springs 73, as above explained.

If desired, the inner surfaces of the trailing ends of the conical segments in FIG. 4 may be reinforced or supported by bands of metal like those at 38 in FIG. 3. These will serve to stiffen the shell when expanded forces are applied thereto and impart a certain stiffness to the trailing edges without making the segments unduly rigid. This insures that small semi-solidified particles will become crushed or forced into proper trowelled position without dragging along and leaving so-called "honeycombing" marks. In this way, the greater portions of the shell segments may be constructed of lightweight and quite flexible material. It is important that the assembly not be of extensive weight to avoid application of greater pressure to the underside than to the upperside, which would cause a thinner lining at the underside than at the upperside.

With all of the embodiments of the invention, expanding mechanisms within the assembly are readily adaptable or adjustable to various pipe sizes with the consequent possibility of standardizing the equipment and the saving of extra spare parts. Contributing to these advantages is the fact that the internal pressure applicable to the troweling means may be readily adjustably manipulated even after the troweling action of the assembly has been initiated.

The anti-friction members for applying pressure to the interior of the conical segments insure that the size and contours of the trowel will be sensitive and highly responsive to small changes in the cross-sectional shape of the pipe and also of the inner periphery of the lining.

It has been found that by using the various embodiments of this invention, one may completely eliminate "finish marks" on the pipe linings.

Although certain embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for trowelling coated interior surfaces of conduits and the like comprising: a generally conically-shaped assembly formed of a plurality of generally longitudinally-extending segments of resilient sheet material having their side edges in circumferentially and relatively slidable overlapping relation; means at the smaller end of the assembly for individually and yieldably mounting each of said segments to permit the trailing end portions of the assembly to expand or contract; a plurality of elements located at circumferentially spaced points around within the trailing end of the assembly for pressing against the interior surfaces thereof, said elements being freely movable circumferentially in respect to the interior surfaces of said segments; and means contained within the assembly for individually and yieldably supporting said elements and directing same radially of the assembly under pressure against said interior surfaces, whereby the trailing end portions of the assembly may resiliently bear against the lining material as the assembly is advanced along within a conduit and while permitting the aforesaid expansion or contraction to accommodate variations in the dimensions of the lining.

2. Apparatus for trowelling coated interior surfaces of conduits and the like comprising: a generally conically-shaped assembly formed of a plurality of generally longitudinally-extending segments of resilient sheet material having their side edges in circumferentially and relatively slidable overlapping relation; means at the smaller end of the assembly for mounting each of said segments while permitting the trailing end portions of the assembly to expand or contract; a plurality of elements located at circumferentially spaced points around within the trailing end of the assembly for pressing against the interior surfaces thereof; and mechanisms contained within the assembly for individually supporting said elements and directing same radially under pressure against said interior surfaces, said mechanisms each comprising spring-biased lever means, whereby the trailing end portions of the assembly may resiliently bear against the lining material as the assembly is advanced along within a conduit and while permitting the aforesaid expansion or contraction to accommodate variations in the dimensions of the lining.

3. Apparatus in accordance with the foregoing claim 2 and in which said lever means comprise bell cranks each having one arm supporting one of said elements and a spring connected to the other arm for urging the element into contact with the interior surface of the assembly, the intermediate portions of said bell cranks being pivotally mounted on common supporting means within the assembly.

4. Apparatus in accordance with the foregoing claim 3 and in which said intermediate portions of said bell cranks are mounted on said common supporting means by means adjustable in directions radially of the assembly, whereby said mechanisms may accommodate conical assemblies of different diameters.

5. Apparatus in accordance with the foregoing claim 3 and in which said bell crank arms which support said elements are formed with means providing for adjustments of the lengths thereof to accommodate conically-shaped assemblies of different sizes.

6. Apparatus in accordance with the foregoing claim 2 and in which manually-operable means accessible at the trailing end of the assembly is provided for adjusting said spring-biased lever means as a group for thereby adjusting the pressure exerted radially against the interior of the conically-shaped assembly.

7. Apparatus for trowelling coated interior surfaces of conduits and the like comprising: a generally conically-shaped assembly formed of a plurality of generally longitudinally-extending segments of resilient sheet material having their side edges in circumferentially and relatively slidable overlapping relation; a relatively less resilient annular band located at the smaller end of said assembly, said band at least partially overlapping the forward ends of said segments; means for attaching each of said segments to said band while permitting flexing movements of the segments; an axially extending rod means in the assembly; means for connecting said rod means to said band comprising a plurality of generally U-shaped leaf springs arranged at circumferentially spaced positions around within said band; means for connecting one end of each of said springs to said rod means; means at the other ends of the springs for attaching same to said band; and resiliently expansible mechanisms within the trailing end portions of said assembly for yieldably retaining same in expanded condition against the coated interior surfaces of the conduit.

8. Apparatus for trowelling coated interior surfaces of conduits and the like comprising: a generally conically-shaped assembly formed of a plurality of generally longitudinally-extending segments of resilient sheet material having their side edges in circumferentially and relatively slidable overlapping relation; relatively rigid annular means to which the forward end of each of said segments is attached; an axially extending supporting rod means in the assembly; a plurality of spring means at circumferentially spaced positions around within said annular means for connecting same with respect to said rod means; and housing means rigidly supported with respect to the forward end of said rod means and providing a rearwardly directed funnel shaped enclosure for the forward portion of the assembly, the rearwardly extending larger end of such enclosure having an annular peripheral edge engaging the forward portions of said annular means.

9. Apparatus for trowelling coated interior surfaces of conduits and the like comprising: a generally conically-shaped assembly formed of a plurality of generally longitudinally-extending segments of resilient sheet material having their side edges in circumferentially and relatively slidable overlapping relation; means at the smaller end of the assembly for mounting each of said segments while permitting the trailing end portions of the assembly to expand or contract; a plurality of anti-friction elements located at circumferentially spaced points around within the trailing end of the assembly and pressing in anti-friction engagement against the interior surfaces thereof; and means contained within the assembly for individually and yieldably supporting said elements under pressure against said interior surfaces, said latter means each comprising a lever with one end connected to support one of said elements; axially extending rod means on which the assemlby is mounted; a plurality of radially extending elements mounted on said rod means and each providing a fulcrum on which one of said levers is pivotally mounted; a plurality of coil springs each connected to one of said lever means; means adjustable along said rod means and to which the other ends of said springs are connected, whereby tension of the springs acts through said levers to resiliently urge said anti-friction elements against the interior of said segments.

10. Apparatus in accordance with the foregoing claim 1 and in which each of said elements comprises a rotatably mounted member.

11. Apparatus in accordance with the foregoing claim 1 and in which each of said elements comprises a member rotatably mounted about an axis extending generally longitudinally of the assembly.

References Cited by the Examiner
UNITED STATES PATENTS
3,188,710  2/1964  Perkins _____ 25—38

OTHER REFERENCES
German printed application No. K 24,557, 11/1956.

J. SPENCER OVERHOLSER, *Primary Examiner.*
G. A. KAP, *Assistant Examiner.*